US009697541B1

(12) United States Patent
Daniel

(10) Patent No.: US 9,697,541 B1
(45) Date of Patent: Jul. 4, 2017

(54) SYSTEM AND METHOD OF CONTROLLING MULTIMEDIA DISPLAY FOR A GAME OF CHANCE

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/611,940

(22) Filed: Feb. 2, 2015

Related U.S. Application Data

(63) Continuation-in-part of application No. 14/025,585, filed on Sep. 12, 2013, and a continuation-in-part of application No. 14/045,628, filed on Oct. 3, 2013.

(51) Int. Cl.
*G06F 17/30* (2006.01)
*G06Q 30/02* (2012.01)

(52) U.S. Cl.
CPC ... *G06Q 30/0267* (2013.01); *G06F 17/30879* (2013.01); *G06F 17/30011* (2013.01)

(58) Field of Classification Search
CPC .. G06Q 20/387; G06Q 30/02; G06Q 30/0251; G06Q 30/0242; G06Q 30/41; G06Q 30/0276; G06Q 30/0277; G06F 17/3001; G06F 27/00
USPC ............ 707/627, 736; 709/217; 705/10, 14, 705/14.66, 14.73; 340/988
See application file for complete search history.

(56) References Cited

U.S. PATENT DOCUMENTS

| 6,484,939 | B1 * | 11/2002 | Blaeuer | B62B 3/1416 235/380 |
| 7,901,288 | B2 * | 3/2011 | Barsness | A63F 13/12 463/30 |
| 9,120,013 | B1 * | 9/2015 | Daniel | G07F 17/3255 |
| 9,298,919 | B1 * | 3/2016 | Demir | H04L 67/20 |
| 9,342,953 | B2 * | 5/2016 | Schugar | G07F 17/32 |
| 2003/0006911 | A1 * | 1/2003 | Smith | G06Q 30/02 340/988 |
| 2006/0143649 | A1 * | 6/2006 | Laney | G06Q 30/02 725/32 |
| 2007/0027763 | A1 * | 2/2007 | Yen | G06Q 30/0252 705/14.5 |
| 2007/0219654 | A1 * | 9/2007 | Frink | G06Q 30/02 700/91 |
| 2007/0293307 | A1 * | 12/2007 | DeRosa-Grund | G07F 17/32 463/25 |
| 2008/0097839 | A1 * | 4/2008 | Koren | G06Q 30/02 705/14.1 |
| 2009/0099928 | A1 * | 4/2009 | Vasile | A63F 13/10 705/14.5 |
| 2010/0198696 | A1 * | 8/2010 | Deshpande | G06Q 30/0276 705/14.72 |
| 2013/0085826 | A1 * | 4/2013 | Woolley | G06Q 30/02 705/14.12 |

(Continued)

FOREIGN PATENT DOCUMENTS

WO    WO2007141020 A1 * 12/2007 ............. G06Q 30/02

*Primary Examiner* — Frantz Coby
(74) *Attorney, Agent, or Firm* — Alberto Interian, III, Esq.

(57) ABSTRACT

The present invention contemplates computer implemented methods, systems and computer program product for enabling user interaction with multimedia content in the context of a prize/game campaign. The invention contemplates incorporation of a scanned coded advertising image which has code on it and which activates the operation of an interactive advertising application on mobile device along with other elements of the invention.

18 Claims, 8 Drawing Sheets

(56) References Cited

U.S. PATENT DOCUMENTS

2013/0086609 A1* 4/2013 Levy .................. G06Q 30/0277
                                                    725/36
2014/0278993 A1* 9/2014 Massoudi .......... G06Q 30/0251
                                                    705/14.55

* cited by examiner

US 9,697,541 B1

SYSTEM AND METHOD OF CONTROLLING MULTIMEDIA DISPLAY FOR A GAME OF CHANCE

PRIORITY CLAIM

This patent application is a Continuation-in-Part patent application and claims priority to U.S. Non-Provisional patent application Ser. No. 14/025,585 titled: "A System And Method Of Advertising Using Multimedia Content" filed Sep. 12, 2013; and U.S. Non-Provisional patent application Ser. No. 14/045,628 titled: "A System And Method Of Controlling Display Of Multimedia Advertising Content" filed Oct. 3, 2013. The entire disclosures of said patent applications are incorporated herein by reference.

FIELD OF THE INVENTION

The present invention relates generally to a system and method of controlling multimedia advertising content and display for a game of chance using an interactive advertising application program configured for use on a mobile device. The application program may be configured for scanning a coded advertising image or a consumer product having a coded advertising image within a coded frame with one or more hyperlinks or icon embedded within, which, in one aspect, may activate one or more hot corner(s) within the coded frame. Upon activation of the interactive advertising application, a user may overlay the coded advertising image with an icon from the hot corner by dragging the icon to a designated area and thereby controlling the multimedia advertising content relating to the captured coded advertising image, e.g. displaying the multimedia advertising content on a mobile communication device's display with full functionality and control.

DESCRIPTION OF THE PRIOR ART

Many advertisers promote their products with promotional codes for entrants to register their codes online to see whether they were successful in winning a prize. This advertising strategy is used by many soda and cereal companies, who include promotional codes on soda caps or cereal boxes. However, obtaining and maintaining customer's interest with this type of advertising promotion is always a challenge as most customers are not near a computer (for example they may not be close to a computer while having their meals) such that it requires afterthought and recollection to enter the promotional code at a more convenient time. Additionally, in a high tech society in order to keep the product interest high, advertisers have to marry high tech or creative visual content with their advertising promotions. Thus there needs to be a system and method of marketing that incorporates technology in an engaging manner that will allow customers to want to participate in promotional advertising competition. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

SUMMARY OF THE INVENTION

Accordingly, an advertiser may publish promotional material on a variety of products such as consumer products that may include a coded frame that may be a square, oblong, rectangle, circular or any other geometric shape with hot corners that can be activated, such that when the coded frame is scanned and any one or more of the hot corners are activated the user may watch a video, browse a web store, locate a coupon, be notified as to whether or not they won a game, prize or the like, in a contest, and even obtain map directions all related to the product or the coded advertising image. In addition, in one aspect of an embodiment of the present invention, when the consumer product having hyperlinks or special embedded code is scanned, the user may be immediately notified as to whether they won a prize, the game or promotion. The user may then be prompted to follow certain directions or instructions as to how to proceed from there. The application, may in one aspect of an embodiment of the present invention, embed all codes and/or hyperlinks and more into a single, double, triple or more frames depending on the structures as created by the advertiser or promotions for the product and/or services as the content can be customized, tracked, and updated.

An aspect of an embodiment of the present invention contemplates a system for user/game participant multimedia content interaction in a product/service contest, where the system may include: a mobile device, the mobile device being enabled by a scanning module, resident on the mobile device, to scan one or more coded advertising image which may be printed and/or embedded in one or more object. In an aspect of an embodiment of the present invention, the object(s) may be the subject of the product contest. The system may also include an interactive advertising application, resident on the mobile device and configured to enable user interaction with one or more multimedia content corresponding to the coded advertising image(s). In one aspect, the one or more multimedia content may be controlled by code embedded corners of the mobile device's display. In another aspect of an embodiment of the present invention, the embedded code within the one or more coded advertising image may determine a game participant's success in the contest. The system may additionally include a communication network in communication with the mobile device and other components of the system, and a remote computer server, which may be in communication with the mobile device, by way of the communication network. In one aspect, the computer server may be configured and programmed to: enable upload of the one or more multimedia content to the remote computer server, determine the game participant's success in the contest, determine what one or more multimedia content to send to the mobile device, and transmit the one or more multimedia content to the mobile device. In another aspect, the computer server may be configured and programmed to determine which coded advertising image(s) are image(s) for which one may obtain or win a prize, coupon, promotion, discount etc.

In an aspect of an embodiment of the present invention the remote computer server may be further configured to coordinate, with the processor of the mobile device, the determination of what multimedia content to send to the mobile device.

In an aspect of an embodiment of the present invention the one or more multimedia advertising content may include any one or more of the following: videos, promotions, prizes, giveaways, vouchers, coupons, coupon codes, bar codes, discounts, pricing, availability, store locations, directions, television commercials, radio advertisements, print advertisements, movies, movie trailers and updates to the same.

In an aspect of an embodiment of the present invention the interactive advertising application may be configured to control the one or more multimedia content.

In an aspect of an embodiment of the present invention the interactive advertising application may be configured to capture statistical information for the one or more coded advertising image.

In an aspect of an embodiment of the present invention the system may include a communication module, resident on either of the mobile device or the remote computer server. In one aspect, the communication module may be configured to enable communication between the mobile device and the remote computer server. In an aspect of an embodiment of the present invention the remote computer server may be configured to control operations of the system.

In an aspect of an embodiment of the present invention the system may include a network module. In one aspect, the network module may be configured to enable access to the communication network.

Another aspect of an embodiment of the present invention contemplates a computer implemented method for multimedia content interaction in an product/service contest, where the method may include executing on a processor the steps of: scanning one or more coded advertising image(s) printed or embedded within one or more object(s), launching an interactive advertising application as a result of scanning the coded advertising image(s), determining whether a game participant has success as a result of code embedded within said one or more coded advertising image, activating, as a result of the scanning, one or more display corner(s) having one or more hyperlink(s) or code embedded within, displaying one or more multimedia advertising content corresponding with the coded advertising image(s), determining the game participant's success in the contest, and enabling user interaction with the one or more multimedia advertising content using code embedded corners of a mobile device's display. The method may also include determining which coded advertising image(s) are image(s) for which one may obtain or win a prize, coupon, promotion, discount etc.

In another aspect of an embodiment of the present invention, the computer implemented method may include the step of storing the one or more multimedia advertising content.

In another aspect of an embodiment of the present invention, the computer implemented method may include the step of checking for updates to the one or more multimedia advertising content.

In another aspect of an embodiment of the present invention, the computer implemented method may include the step of retrieving one or more update to the one or more multimedia advertising content.

In another aspect of an embodiment of the present invention, the computer implemented method may include the step of notifying a user of a prize award corresponding with the one or more coded advertising image, as a result of the scanning.

A further aspect of an embodiment of the present invention contemplates a computer program product which may include a computer usable medium having control logic stored on it for causing a computer processor to enable multimedia content interaction in a product/service contest, the control logic may include computer readable program code for: scanning one or more coded advertising image(s) printed or embedded within one or more object(s), launching an interactive advertising application as a result of scanning the coded advertising image(s), determining whether a game participant has success as a result of code embedded within said one or more coded advertising image(s), activating, as a result of the scanning, one or more display corner(s) having one or more hyperlink(s) or code embedded within, displaying one or more multimedia advertising content corresponding with the coded advertising image(s), determining the game participant's success in the contest, and enabling user interaction with the one or more multimedia advertising content using code embedded corners of a mobile device's display. The computer program product may also include computer readable program code for determining which coded advertising image(s) are image(s) for which one may obtain or win a prize, coupon, promotion, discount etc.

In a further aspect of an embodiment of the present invention, the computer program product may include computer readable program code for storing the one or more multimedia advertising content.

In a further aspect of an embodiment of the present invention, the computer program product may include computer readable program code for checking for updates to the one or more multimedia advertising content.

In a further aspect of an embodiment of the present invention, the computer program product may include computer readable program code for retrieving one or more update(s) to the one or more multimedia advertising content.

In a further aspect of an embodiment of the present invention, the computer program product may include computer readable program code for notifying a user of a prize award corresponding with the one or more coded advertising image, as a result of the scanning.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
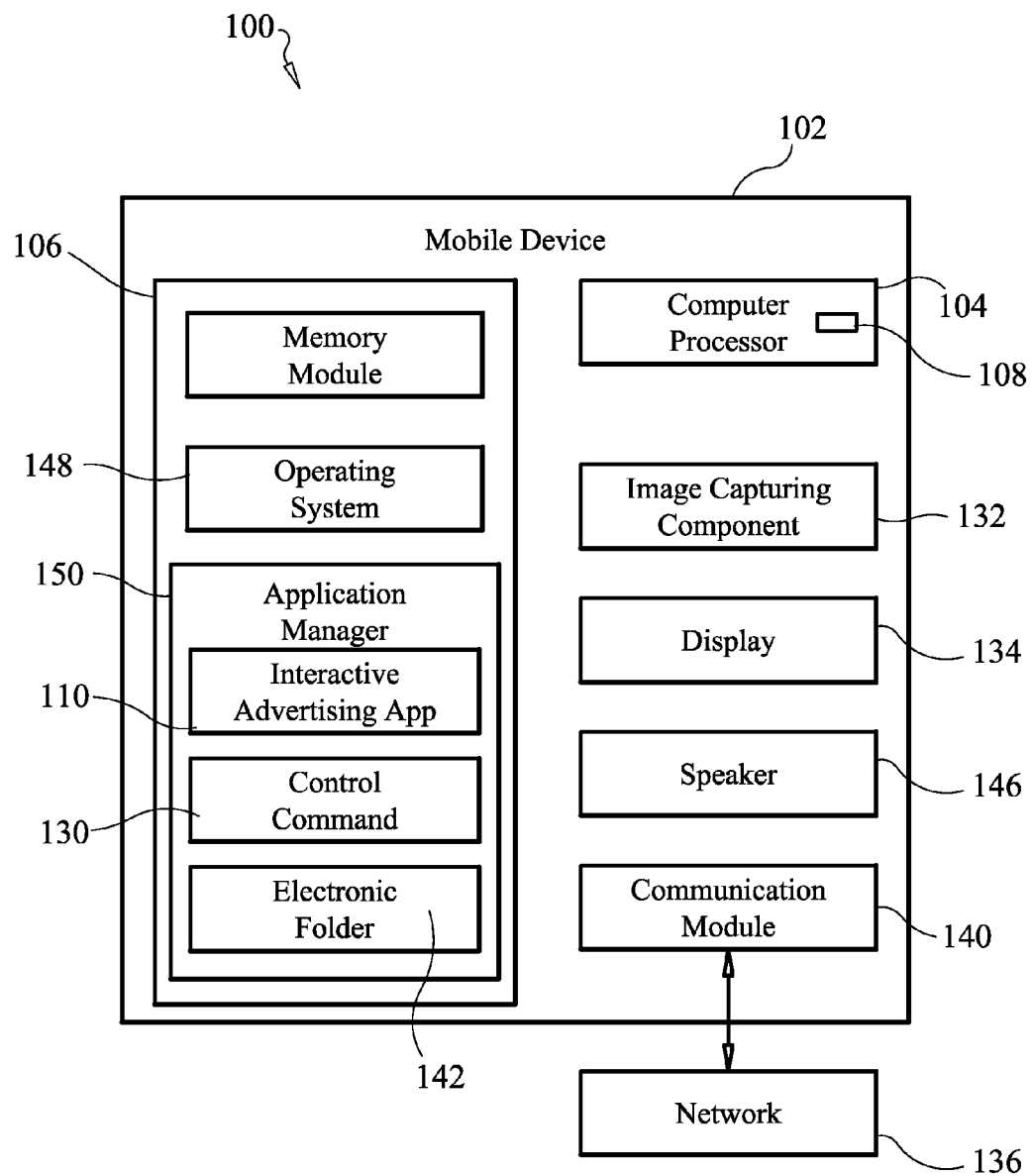
FIG. 1 illustrates an exemplary system showing a mobile device according to an aspect of an embodiment of the present invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

Referring now to FIG. 1 an exemplary system 100 showing mobile device 102 according to an aspect of an embodiment of the present invention is shown. System 100 may include, as shown: mobile device 102 that may include computer processor 104 in electronic communication with memory module 106, computer executable instructions 108 readable and executable by the computer processor 104 and configured for performing any one or more of the following: launching an interactive advertising application program ("interactive advertising app") 110 configured for controlling multimedia advertising content 112 corresponding to coded advertising image(s) 114 within a coded frame 116 that includes one or more hot corners 118, 120, 122, 124—each having at least one hyperlink 126 (not shown) embedded within, and configured for controlling the multimedia advertising content 112 corresponding to the coded advertising image(s) 114 within the coded frame 116 by overlaying the one or more coded advertising image(s) 114 with the at least one embedded icon 128, which has an associated control command 130; the mobile device's image capturing component 132 which may be enabled by an image capturing or scanning module (not shown) for scanning the one or more coded advertising image(s) 114 within the coded frame 116 causing the one or more hot corners 118, 120, 122, 124 to be activated; memory module 106 for storing a captured one or more coded advertising image(s) 114 that may be retrieved for user interaction; and display 134 for displaying the one or more multimedia advertising content 112 for the captured one or more coded advertising image(s) 114 pursuant to a control command 130 associated with the at least embedded one hyperlink 126 (not shown). In one aspect of an embodiment of the present invention, there may be an embedded icon 128 instead of embedded hyperlink 126 (not shown) (not shown). Each of hot corners 118, 120, 122, 124 may constitute a particular function for controlling multimedia advertising content 112 which may be implemented when any of hot corners 118, 120, 122, 124 is dragged to designated area 208. In one aspect of an embodiment of the present invention, icon 128 may represent a function of each of hot corners 118-124. For instance, one of the hot corners may represent "play" to which effect would play the multimedia advertising content 112 when the corresponding icon 128 is dragged to designated area 208. Designated area 208 may, in one aspect of an embodiment of the present invention, have code embedded within it to allow for the execution of the command(s), code(s) and/or hyperlink(s) embedded within each respective hot corner which may be executed upon dragging icon 128 to area 208. Multimedia advertising content 112 as used in this disclosure may include any one or more of the following: videos, promotions, coupons, coupon codes, bar codes, discounts, pricing, availability, browse online store, store locations, directions, television commercials, radio advertisements, print advertisements, movies, and movie trailers and the like.

Mobile device 102 may be any type of electronic computerized communication device configured to communicate wirelessly and/or wired with other mobile devices 102', 102", such as but not limited to, cellular phones (e.g., an iPhone, Android, Palm, Blackberry, or any "smart phone" as are generally known and used in the art), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network 136, wide area network such as the Internet 136, or any other type of network device that may communicate over a network 136. Computer 138 as used herein includes but is not limited to a network enabled computer, cellular phones, a laptop or personal digital assistant subject to wired/wireless connectivity, and configured with a computer processor 104.

Mobile device 102 may include various hardware components, e.g. one or more computer central processor 104, memory module 106, and one or more communication module 140. Computer central processor 104 may be any type of processor, such as, but not limited to, a central processing unit (CPU), a microprocessor, a video processor, a front end processor, a coprocessor, a single-core central processor, a multi-core processor, and the like. Central processor 104 may be programmed to activate the interactive advertising app 110 running in background while the mobile device 102 is powered on, for viewing multimedia advertising contents 112, 112' (e.g. videos, promotions, coupons, coupon codes, bar codes, discounts, pricing, availability, browse online store, store locations, directions, television commercials, radio advertisements, print advertisements, movies, movie trailers, and the like), which will be displayed on the mobile device's display 134 in for example a graphical, audio, text format and/or any combination thereof.

In some embodiments, mobile device 102 may have its own icon or other visual indicator displayed thereon (not shown) for launching or providing access to the interactive advertising app 110. When a user selects the respective interactive advertising app's icon (e.g. by touching a touchscreen, or selecting it using a pointing device, roller ball, arrow keys, or other controller), where upon selection, the computer central processor 104, launches the interactive advertising app 110 and the computer central processor 104, which may be electronically connected to display 134, controls display 134 to display the interactive advertising app 110 as launched on the mobile device 102.

Mobile device 102 may include memory module 106 which may be electrically or mechanically connected to computer processor 104. In the case of electronic connections, the electronic connections may be wired and/or wireless connections. Memory module 106 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory module 106 may be used to store information, such as coded advertising images 114, 114', hyperlinks 126, 126' corresponding to the coded advertising images 114, 114', registered multimedia advertising content 112, 112' for the corresponding coded advertising images 114, 114', company's website address or Uniform Resource Locators (URLs), control commands 130, 130', coded frames 116, 116', electronic folder 142 for storing a plurality of captured coded advertising images 114, 114', directions 144 and the like. Information stored on the mobile device's memory module 106 may be retrieved using the computer processor 104 and may be published by push notification on the mobile device's display 134 or broadcasted over a speaker 146 using the type and configuration of speakers that are well known and used in the arts for mobile devices 102, 102'.

Mobile device 102 may be equipped with communication module 140, either electrically or mechanically connected to the computer central processor 104. In the case of electronic connections, the electronic connections may be wired and/or wireless. In some embodiments, communication module 140 may be a wireless communication module 140, which employ short range wireless protocol, such as, but not limited to, a radio frequency transceiver, a radio frequency receiver, and/or a radio frequency transmitter for communicating over the Internet to access for example registered companies URLs and their corresponding multimedia advertisements 112, 112' that correspond to the coded advertising images 114, 114' displayed on for example, mobile device 102. It is understood that each coded advertising image 114 is unique even if the multimedia advertisements 112, 112' are not.

In embodiments where the wireless communication module 140 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication module 140 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication module 140 may be operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver and to communicate over the Internet 136.

In an aspect of an embodiment of the present invention, mobile device 102 may include computer processor 104, disposed within and in electronic communication with the memory module 106. Computer processor 104 may include computer executable instructions 108 readable and executable by the at least one processor 104. Computer executable instructions 108 are operative to perform all the necessary functions for the system 100 and methods disclosed herein, including but not limited to: automatically launching the interactive advertising app 110, i.e., running a background service while the mobile device 102 is powered on, and controlling multimedia advertising content 112 corresponding to one or more coded advertising image(s) 114 within a coded frame 116 that includes one or more hot corners 118, 120, 122, 124 with at least one embedded hyperlink 126 (not shown) or icon 128 within and the like. Computer executable instructions 108 may be loaded directly on the mobile device's processor 104, or may be stored in mobile device's memory module 106, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 108 may be any type of computer executable instructions 108, which may be in the form of a computer program, the program being composed in any suitable programming language or source code, such as C++, C, JAVA, JavaScript, HTML, XML, and other programming languages.

In an aspect of an embodiment of the present invention, interactive advertising app 110, which may be stored in the mobile device's memory module 106 also may include computer executable instructions 108' readable and executable by the at least one processor 104 and may be configured for performing any all the necessary functions for the system 100 and methods of the invention, which may include any one or more of the following: controlling a multimedia advertising content 112 corresponding to one or more coded advertising image(s) 114 within a coded frame 116 that includes one or more hot corners 118, 120, 122, 124 with at least one hyperlink 126 (not shown) or icon 128 embedded within, responsive to the control command 130, and configured for controlling the multimedia advertising content 112 corresponding to the one or more coded advertising image(s) 114 within the coded frame 116 by overlaying the one or more coded advertising image(s) 114 with the at least one embedded icon 128, which has an associated control command 130; activating the one or more hot corners 118, 120, 122, 124 when the one or more coded advertising image(s) 114 within the coded frame 116 is scanned; displaying the at least one multimedia advertising content 112 for the captured one or more coded advertising image(s) 114 pursuant to a control command 130 associated with the at least one embedded icon 128; receiving at least one control command 130 for displaying the at least one multimedia advertising content 112 within the coded frame 114 with full functionality for review and control when the multimedia advertising content 112 is published; wherein those control commands 130 for displaying the at least one multimedia advertising content 112 include but are not limited to any one or more of the following: play, stop, fast-forward, rewind, pause, maximize viewing, minimize, end and cancel; retrieving directions 144' related to the multimedia advertising content 112 for the captured one or more coded advertising image(s) 114; displaying the directions 144, 144' as retrieved within the coded frame 116; retrieving the at least one multimedia advertising content 112 by linking to an advertiser's website via its web address; providing for product purchases related to the coded advertising image 114; and storing a plurality of captured coded advertising images 114, 114' within an electronic folder 142 with full functionality for managing stored electronic data as is customary in the arts.

In an aspect of an embodiment of the present invention, mobile device 102 may include any kind of display 134, such as, but not limited to: a liquid crystal display ("LCD") screen, a light emitting diode ("LED") display, touchpad or touch screen display, and/or any other method, capability known in the arts for emitting a visually perceptible output. Mobile device's processor 104 may be in electronic communication with its display 134. In other embodiments, display 134 may be wirelessly connected to processor 104. Display 134 may be controlled in a number of ways using, without limitation, a touch screen, a stylus, and the like. In some embodiments, display 134 may be electronically connected to a mobile device 102 according to the hardware and software protocols that are known and used in the arts. Computer processor 104 controls the mobile device's display 134, which may be configured for displaying the one or more coded advertising images 114, multimedia advertising contents 112, 112' and the like.

In another aspect of an embodiment of the present invention, mobile device 102 may also include software components that may be stored in memory module 106. Memory module 106 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile device 102. Mobile device 102 may also contain an input element for inputting data and an output element for displaying data.

Also stored on the memory module 106 may be an operating system 148, application manager 150, and the interactive advertising app 110. Interactive advertising app 110 may be an independent component or may be incorporated into the operating system 148. Interactive advertising app 110 may be a computer-executable component, readable and executable by the mobile device's computer processor 104, wherein the interactive advertising app 110 links to the Internet to retrieve one or more multimedia advertising contents 112, 112' to be displayed on the mobile device's display 134. The multimedia advertising contents 112, 112' may be in any format, e.g. audio, video, pictorial, text message, graph, and as such is published or also broadcasted in any format on the mobile device 102.

Application manager 150 may include computer-executable components that operate in the mobile device 102 and may be implemented in a variety of ways. In one embodiment of the invention, application manager 150 may use one or more computer-executable components for interacting with interactive advertising app 110. In another embodiment, interactive advertising app 110 may be incorporated in application manager 150 to receive information from the input element, to communicate with, and/or to control the operations of interactive advertising app 110.

Interactive advertising app 110 may include, in one aspect of an embodiment, a browser, for use on the mobile device 102, or a similar browsing device. Interactive advertising app 110 may be any type of software application, such as a standalone application designed to run on a mobile platform, such as a mobile device running an operating system 148, such as iOS™, Android™, Windows Mobile™, Blackberry™, and the like. Interactive advertising app 110 may be operative for an iPhone, any other "smart phone," mobile device, cellular phone, PDA, GPS or any other mobile device 102 capable of handling electronic transactions dealing with dynamic content, object, application, or software.

In some embodiments, the interactive advertising app 110 may be designed to run on a social network platform, such as FACEBOOK® or JUSTSYNC®. In some embodiments, interactive advertising app 110 may reside on a server computer and may be downloadable from the server computer or otherwise reside in the mobile device's local memory module 106. For example, in one embodiment, the interactive advertising app 110 may be on a mobile device (such as an iPhone, Blackberry, or other "smart phone") and the full-sized software program may be on a computer, where communications may occur over a network 136 or directly, either wired or wirelessly.

Figure 2:
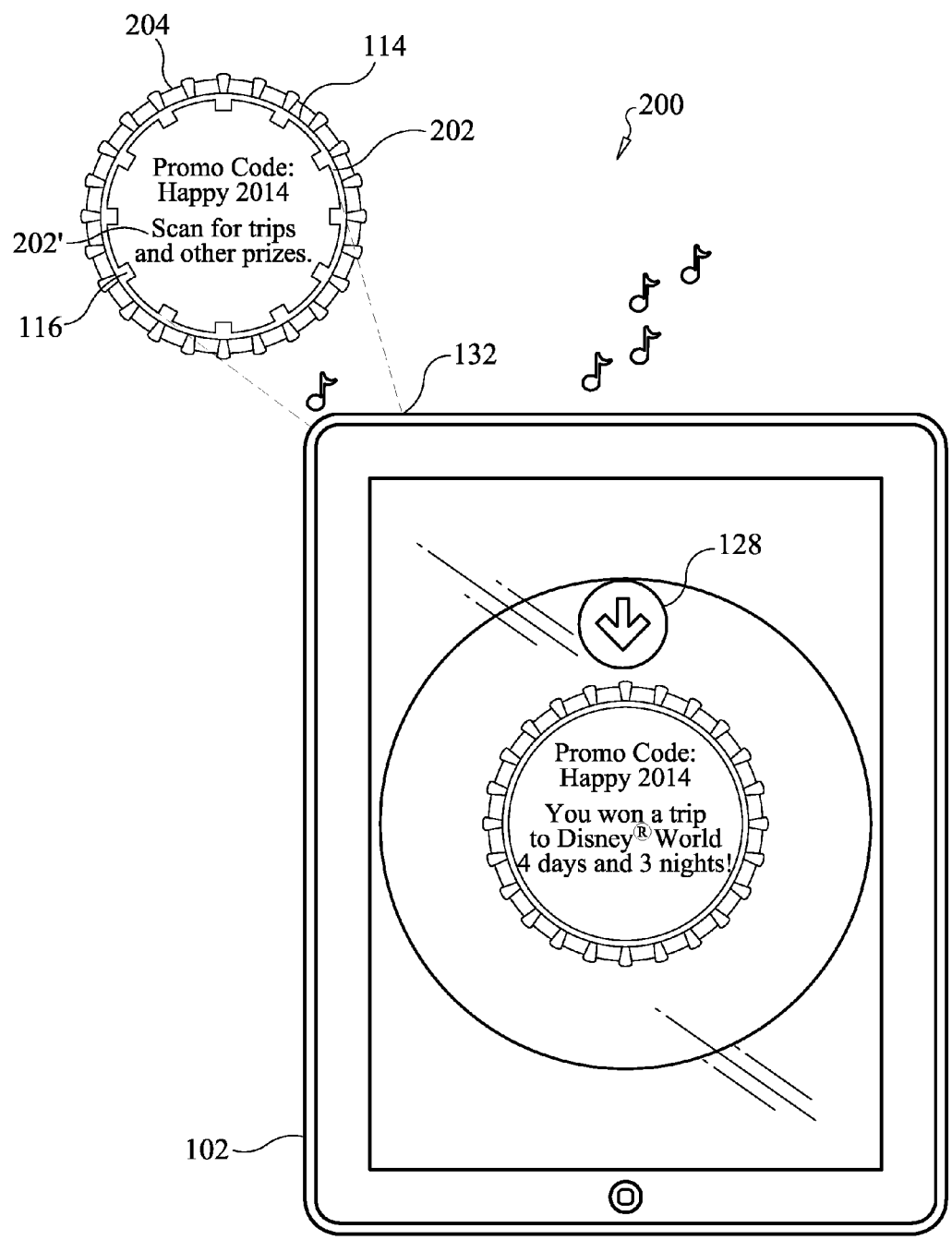
FIG. 2 illustrates an exemplary system showing coded advertising image and its scanned counterpart on a mobile device according to aspect(s) of embodiment(s) of the present invention.
Figure 3A:
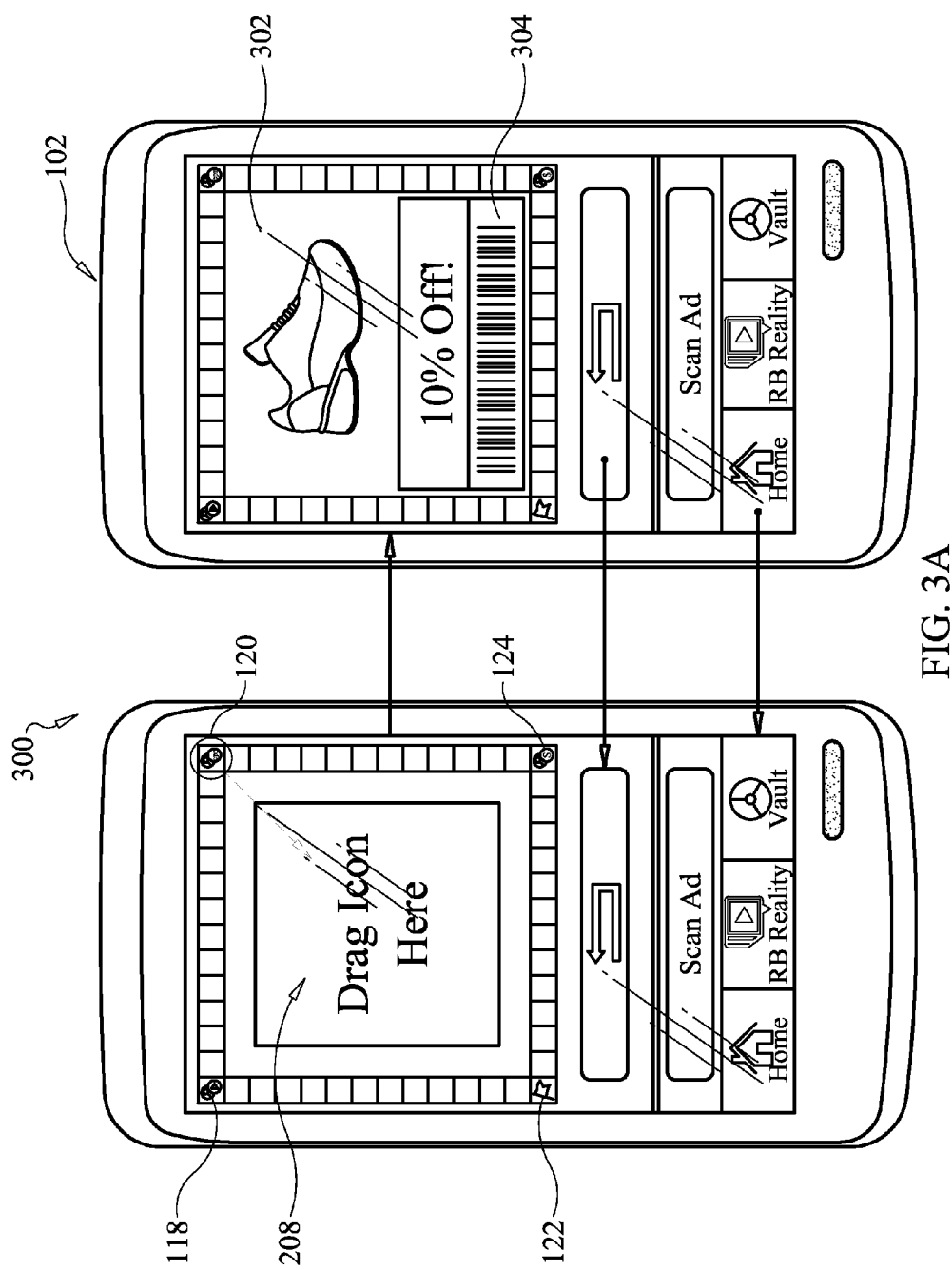
FIGS. 3A & 3B illustrate examples of the system and method in use according to aspect(s) of embodiment(s) of the present invention.
Figure 3B:
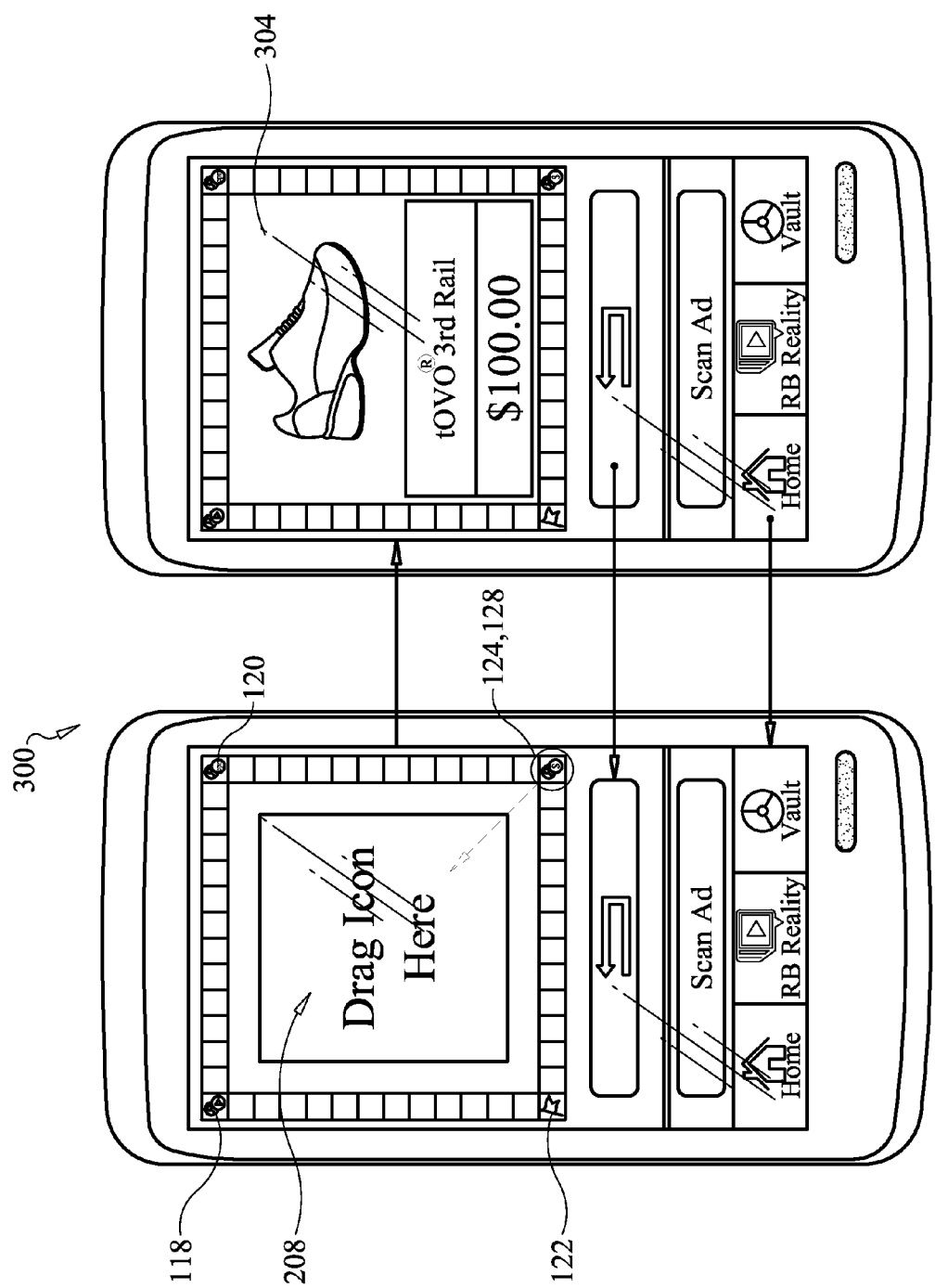

Referring now to FIGS. 2-3B, an exemplary system 200 examples of the system and method in use according to aspect(s) of embodiment(s) of the present invention, are shown. With system 200, a particular consumer product, which, for descriptive non-limiting purposes is displayed as a soda cap here (or as a scanned coupon as shown in FIGS. 3A & 3B), is shown having certain special markings 202, 202' with hyperlinks or code embedded within. This consumer product (or the scanned coupon of FIGS. 3A & 3B) may be part of a contest, game and/or promotion being run by an advertiser, manufacturer, vendor etc. With mobile device 102, a game participant or user may scan soda cap 204 having special markings 202, 202' with hyperlinks and/or code. If the user or game participant has a winning soda cap (which may be indicated by the hyperlinks and/or code embedded or printed in the soda cap), the scanned hyperlink and/or code would notify the game participant or user that they had won the game, won a prize or won something. This would be done in conjunction with interactive advertising application 110 which would be resident on mobile device 102. The user/game participant would then be given instructions on how to proceed from there. In one aspect, he/she may be directed to click on an additional link on display 134 which may take the user/game participant to the advertiser's, manufacturer's, vendor's or game host's website. In one aspect of an embodiment of the present invention, upon scanning soda cap 204, a digital image may be reproduced on display 134. The digital image of 204 may have a number of icon(s) 128 around it which represent different control functionalities for the multimedia content 112 which may have been part of the code and/or hyperlinks 202, 202'. If the user or game participant did not win, he/she would be notified accordingly. In one aspect of an embodiment of the present invention, notification may be done visually on display 134 or aurally by way of speaker 146. In one aspect of an embodiment of the present invention, the code and/or hyperlinks in soda cap 202, in conjunction with interactive advertising app 110 may collectively determine whether or not the individual has won or not won the game, contest or promotion. In another aspect of an embodiment of the present invention, interactive advertising app 110, upon the scanning of soda cap 204 may transmit the code and/or hyperlinks of soda cap 204 to a remote server which may then determine what action to take, including whether to award the user/game participant with a prize for having a particular type of soda cap, or the winning soda cap 204 etc.

As previously discussed, the interactive advertising app 110 may appear as one or more icons 128, 128' (FIGS. 3A & 3B) on the mobile device's display 134 that may be manually activated to launch the interactive advertising app 110 or different segments of the app 110, while in some embodiments, the interactive advertising app 110 may be automatically launched as soon as the mobile device 102 is turned on, and the interactive advertising app 110 may run in background service while the mobile device 102 is powered on. In background mode, user may continue to use the mobile device 102 in its customary and ordinary use, e.g. make calls, create and respond to SMS text messages or use the mobile device 102 in any other manner deemed ordinary and customary use while the interactive advertising app 110 runs in the background.

In either embodiment, once the interactive advertising app 110 is launched, user may use the interactive advertising app 110 on the mobile device 102 to control multimedia advertising content 112 corresponding to one or more coded advertising image(s) 114 within a coded frame 116 as displayed on the mobile device's display 134 that includes one or more hot corners 118, 120, 122, 124 with at least one hyperlink 126 (not shown) or icon 128 embedded within. The multimedia advertising content 112 may be controlled by overlaying the one or more coded advertising image(s) 114 with at least one icon 128 that has an associated control command 130 linked to the icon 128 for controlling the display of the multimedia advertising content 112. In the exemplary embodiment shown in FIG. 2, the coded advertising image 114 may be printed on a soda cap within a coded frame 116 with one or more embedded hyperlinks 126, 126' and/or icon 128, 128' embedded within.

It is understood that each coded advertising image 114 is unique, e.g. contains embedded random numbering such that the correct corresponding multimedia advertising content 112 is retrieved as no two coded advertising images 114, 114' are alike. In one embodiment, the advertiser registers with the systems 100 & 200 described herein, and the coded advertising images 114, 114' are created for and/or by the advertiser and linked to the corresponding multimedia advertising content 112, 112. Thus, any user scanning the coded advertising image 114 may review the corresponding multimedia advertising content 112 as retrieved from the interactive advertising app 110's stored electronic data, which may comprise of memory module 106' utilizing an electronic database 106' connected to a remote server computer 138.

In other embodiments, an advertiser may have a customized version of the interactive advertising app 110, and the advertiser may create its own coded advertising images 114, 114' linked to corresponding multimedia advertising content 112. Notwithstanding the advertiser's control over newly created coded advertising images 114, 114' with corresponding multimedia advertising content 112, each coded advertising image 114 may still be coded uniquely, e.g. containing embedded random numbering such that the correct corresponding multimedia advertising content 112 is retrieved so that no two coded advertising images 114, 114' for two different advertisers are alike. A user scanning the coded advertising image 114 may review the corresponding multimedia advertising content 112 as retrieved from the interactive advertising app 110's electronic database 106', or as linked to the advertiser's website to locate the stored multimedia advertising content 112.

Using a mobile device 102, a user/game participant may interact with the exemplary soda cap by scanning the coded advertising image 114, which has additional markings 202, 202' that distinguishes it from the norm, such that it visually indicates to a casual observer that there is more to the coded advertising image 114 than the printed words and images. It is understood that the coded advertising image 114 may be in a coded frame 116 of any geometric shape. Here, the coded frame 116 is circular but could easily have been a square, rectangle or any other geometrical shape. For users familiar with the systems 100, 200, and method, the markings 202, 202' are familiar indicating that the advertisement is a coded advertising image 114. For new users, the coded advertising image 114 invites the user to place his/her mobile device 102 on the coded advertising image 114. In doing so, the computer executable instructions 108 executable by the computer processor 104 may be configured for launching the interactive advertising app 110 that may include computer executable instructions 108', also executable by the mobile device's computer processing unit 104, and scans the coded advertising image 114. In some aspects of embodiments of the present invention, the icons 128, 128', 128", 128''' may be hidden and are embedded within the coded advertising image 114, i.e. not viewable until displayed in the interactive advertising app 110.

In some embodiments, the ability to fully capture the coded advertising image 114 may be restricted because of the pixilation of the mobile device's image capturing component 132. In that embodiment, an add-on autofocus lens may be attached to the mobile device's image capturing component 132 with more powerful lens, e.g. 12-30 megapixels such that the user can capture distant images, e.g. coded advertising images 114, 114' regarding other public events and the like that may be posted in public areas, on fences, walls, etc.

The multimedia advertising content 112 may be controlled by the interactive advertising app 110 which by its computer executable instructions 108' control the display of the at least one multimedia advertising content 112 with full functionality for review and control using control commands 130, 130' which include but are not limited to any one or more of the following: play, stop, fast-forward, rewind, pause, maximize viewing, minimize, end and cancel.

In some embodiments, the interactive advertising app 110 may be configured for capturing statistical information for the one or more coded advertising image(s) 114 or the multimedia advertising content 112 that was viewed and for providing reports based on captured statistical information. Multimedia advertising content 112 may be published in any one or more of the following formats: audio, video, pictorial, graphical, text format and/or any combination thereof. Accordingly, advertisers can market their products and services with targeted messages for the user's review directly as clearly only those persons that are interested in the product will bother to scan coded advertising images 114, 114', activate the hyperlinks 126 or the coded advertising images 114, 114'.

As soon as the mobile device's image capturing component 132, e.g. a camera of the like and kind that are well known and used in the art for mobile phones 102, scans the one or more coded advertising image(s) 114 within the coded frame 116 it causes the one or more hot corners 118, 120, 122, 124 to be activated for interactive display of the corresponding multimedia advertising content 112. The activated one or more hot corners 118, 120, 122, 124 may pulsate, blink or the icons 128, 128' may be highlighted and displayed in a color contrast or animated format to alert the user of the option to interact with the coded advertising image 114 by exploring one or more of the interactive control commands 130, 130'. As shown (in FIG. 3A), the icons 128, 128' are depicted as a magnifying glass shaped search icon 128. It is understood that the clickable icon 128 may be in any particular geometric shape or other configuration as it is representative of a control command 130 for controlling the multimedia advertising content 112 for the coded advertising image 114.

In some embodiments, after the coded advertising image 114 is scanned, one or a plurality of interactive icons 128, 128', 128", 128''' and therefore the control commands 130, 130', 130", 130'" are active and the corresponding multimedia advertising content 112 can be controlled by overlaying the coded advertising image 114 with at least one icon 128, i.e. dragging the icon 128 to the designated area 208.

As shown, once the coded advertising image 114 within the coded frame 116 is scanned the multimedia advertising content 112 may be displayed on display 134. The multimedia advertising content 112 may be displayed in audio, audiovisual, display or any other multimedia format within the coded frame 116. As such, the interactive advertising app 110 makes a determination of whether a corresponding multimedia advertising content 112 exists; conducts at least one electronic computerized search for the corresponding multimedia advertising content 112 to the coded advertising image 114 on the mobile device's memory module 106 or hyperlinks to the Internet 136 to obtain the multimedia advertising content 112 from, e.g. the advertiser's website; retrieves the at least one multimedia advertising content 112; and displays the at least one multimedia advertising content 112 on the mobile device's display 114. Accordingly, advertisers can market their products and services with targeted messages for their customers.

Referring specifically now to FIGS. 3A & 3B examples of the system 300 and method in use according to aspect(s) of embodiment(s) of the present invention are shown. As shown in FIG. 3A, the operative interactive icon 128 that was activated included the control command 130 for displaying any related promotions 302, e.g. an electronic coupon 302, within the coded frame 116. The coded advertising image 114 included a promotion for a "TOVO®" product, i.e. a coupon 302 and as such when the icon 128 for displaying coupons 302, 302' was activated, the interactive advertising app 110 searched the mobile device's memory module 106 or hyperlinked to the app's electronic database 106' or the advertiser's website to locate the related coupon 302 for display within the coded frame 116. As shown, the other icons 128', 128", 128'" are still visible and accessible for user interaction. Accordingly, user has the option of displaying the coupon 302 for a purchase at a store as the coupon's barcode 304 may be visible for scanning and also available via use's mobile device 102.

As shown in FIG. 3B, the operative interactive icon 128 for the control command 130 for displaying product details 306, e.g. product description, including pricing or other specifications, which may be displayed as a visual image as opposed to a video within the coded frame 116.

Figure 4:
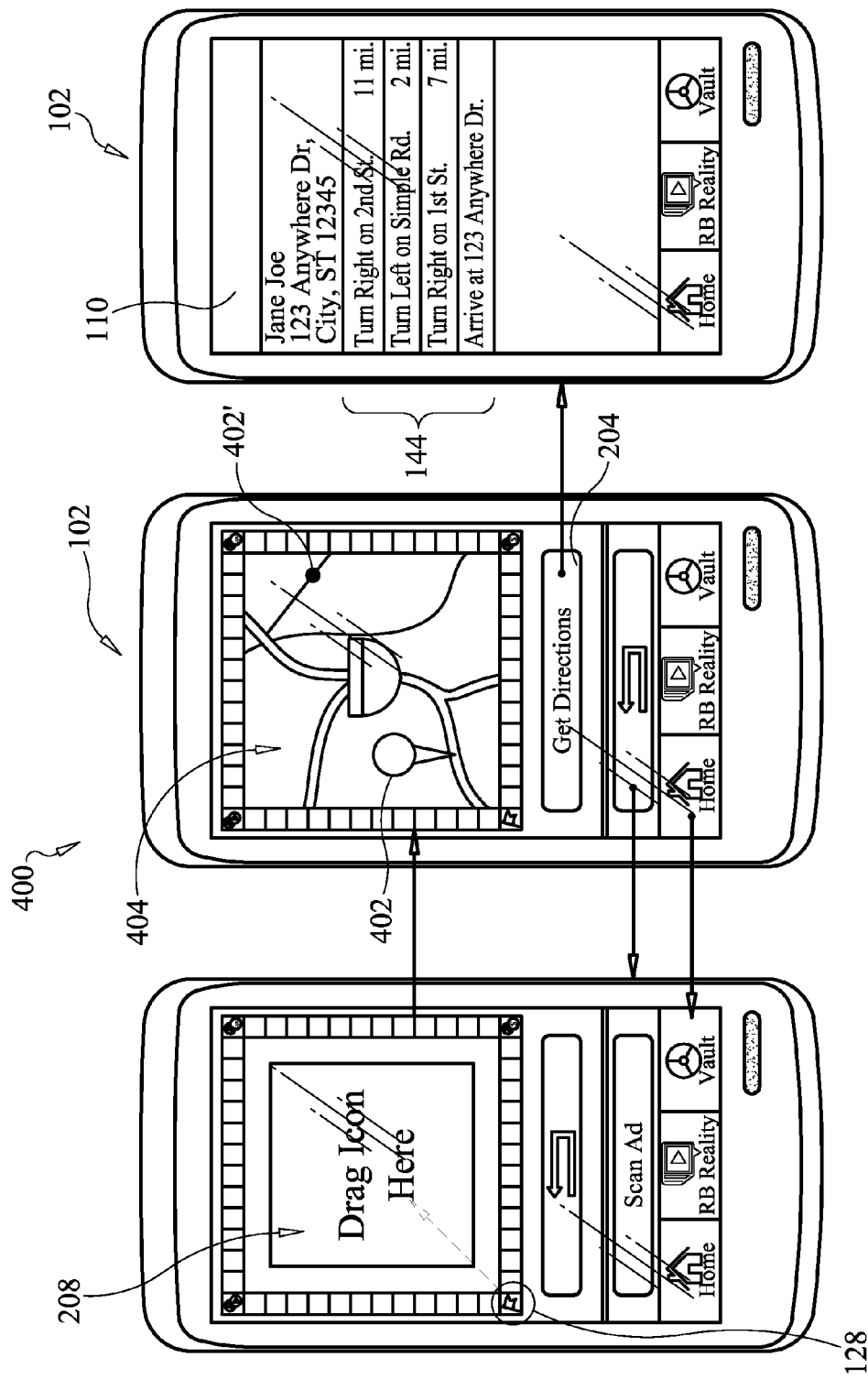
FIG. 4 illustrates an exemplary system and implemented method according to an aspect of an embodiment of the present invention.

Referring now to FIG. 4 an exemplary system 400 and method according to an aspect of an embodiment of the present invention is shown. Here, interactive icon 128 may be operative for the control command 130 for locating stores 402, 402' that sell the advertised product. As such, embedded within the coded frame 116 is a hyperlink 126 (not shown) to link to the Internet and/or further the store's web address to locate stores 402, 402'. As shown, once the stores 402, 402' are located, directions 144 to these stores 402, 402' may be obtained using an exemplary radio button 206. The directions 144 may be provided as a map 404 or detailed listing including turn by turn directions 144 for the location of a particular store 402 or broadcasted in audio over the speaker 146.

Figure 5A:
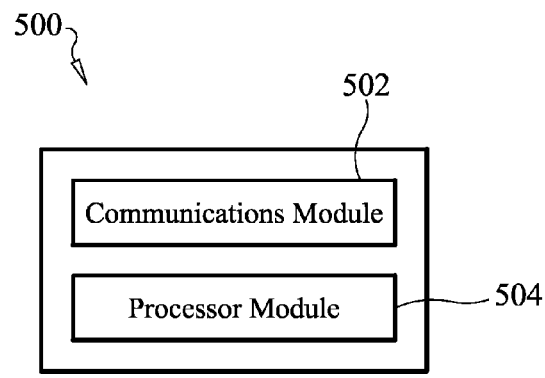
FIGS. 5A & 5B illustrate exemplary systems according to aspect(s) of embodiment(s) of the present invention.
Figure 5B:
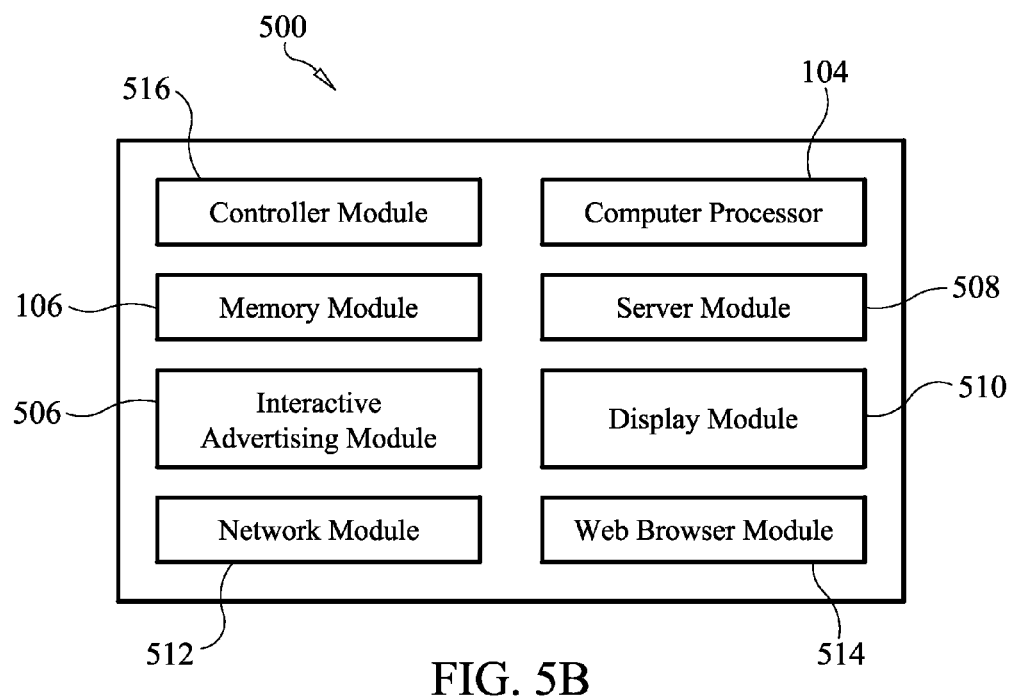

Referring now to FIGS. 5A & 5B a system 500 in accordance with aspect(s) of embodiment(s) of the present invention is shown. System 500 may include a communications module 502 and processor module 504 configured for performing system 500's functions mentioned herein. In an aspect of an embodiment of the present invention, the term "module," as used throughout this disclosure, may refer to a unit of distinct functionality that may be presented in software, hardware, or combinations thereof. When the functionality of a module is performed in any part through software, the module includes a machine readable medium.

Communications module 502 may be configured for communicating over the computer network 136 to locate for example multimedia advertising content 112, 112' for one or more advertisers. In one embodiment, communications module 502 may comprise a hardware aspect, such as communications hardware. Such communications hardware may include, but may not be limited to, a network adapter and/or card, a modem, and the other like communications devices and/or future wireless protocol suitable for transmitting and receiving data. In yet another embodiment, communications module 502 may comprise both hardware and software aspects, such as those described directly above and elsewhere throughout the present disclosure. In one aspect of an embodiment of the present invention, communications module 502 may be operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver.

Processor module 504 may comprise of a hardware aspect such as a computer processor 104, including, but not limited to, any of those previously described with reference to the embodiments described throughout the present disclosure. In another embodiment, processor module 504 may comprise of a software aspect, such as, but not limited to, a computer program, such as an operating system, matching software, word parsing software, word editor, multimedia player and the like. In yet another embodiment, processor module 504 may comprise both hardware and software aspects, such as those described directly above and elsewhere throughout the present disclosure. In some embodiments, processor module 504 may include software, e.g. computer software program, and hardware components to activate interactive advertising module 506 (as shown in FIG. 5B) for processing coded advertising images 114 and multimedia advertising content 112. In one aspect of an embodiment of the present invention, this may be pursuant to the activation, launch and/or commands by interactive advertising application 110.

As shown in FIG. 5B, system 500 may include memory module 106 to store for example, coded advertising images 114, 114', hyperlinks 126 corresponding to the coded advertising images 114, 114', registered multimedia advertising content 112, 112' for the corresponding coded advertising images 114, 114', company's website address or advertisers' URLs, control commands 130, 130' and the like. Memory module 106 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory module 106 may possess a software aspect, such as, but not limited to, database building software, file management software, and the like. In yet another embodiment, memory module 106 may comprise both hardware and software aspects, such as those described directly above and elsewhere throughout the present disclosure.

In another embodiment, system 500 further may include a server module 508 to control the systems, processes, functions and/or implementations discussed herein. Server module 508, in one aspect of an embodiment of the present invention, may be a remote module, remote from, but in communication with, mobile device 102. Server module 508, in another aspect of an embodiment of the present invention, may host the interactive advertising module 506 for reading the coded advertising images 114, 114' for controlling the corresponding multimedia advertising content 112, which may be accessed over a closed computer network 136, such as, but not limited to, a local area network (LAN), a wide area network (WAN), an integrated services digital network, a dial-up network, or other forms of a closed computer network 136. In an alternate embodiment of system 500, server module 508 provides for access over an open computer network 136, such as, but not limited to, a world-wide-web, e.g. the Internet 136 or other forms of an open computer network 136. In one embodiment, server module 508 may comprise a hardware aspect, such as, but not limited to, a server computer 138. In another embodiment, server module 508 may comprise a software aspect, such as hosting computer software, including, but not limited to, a server operating system. In yet another aspect of an embodiment of the present invention, server module 508 may comprise both hardware and software aspects, such as those described directly above and elsewhere throughout the present disclosure. In yet another aspect of an embodiment of the present invention, certain multimedia advertising content 112 may be uploaded to server module 508 which may subsequently be sent to mobile device 102.

System 500 may include interactive advertising module 506 that may include or be in communication with a software aspect, e.g. a computer software program that resides on a server module 508 and/or mobile device 102. In another embodiment, the interactive advertising module 506 may comprise of a hardware aspect. In yet another embodiment, the interactive advertising module 506 may comprise both hardware and software aspects, such as those described directly above and elsewhere throughout the present disclosure. Interactive advertising module 506 may include software program comprising of computer executable instructions 106 readable and executable by the computer processor 104 and configured for: controlling a multimedia advertising content 112 corresponding to one or more coded advertising image(s) 114 within a coded frame 116 that may include one or more hot corners 118, 120, 122, 124 with at least one hyperlink 126 (not shown) or icon 128 embedded within, responsive to the control command 130, and configured for controlling the multimedia advertising content 112 corresponding to the one or more coded advertising image(s) 114 within the coded frame 116 by overlaying the one or more coded advertising image(s) 114 with the at least one embedded icon 128, which has an associated control command 130; activating the one or more hot corners 118, 120, 122, 124 when the one or more coded advertising image(s) 114 within the coded frame 116 is scanned; displaying the at least one multimedia advertising content 112 for the captured one or more coded advertising image(s) 114 pursuant to a control command 130 associated with the at least one embedded icon 128; receiving at least one control command 130 for displaying the at least one multimedia advertising content 112 within the coded frame 114 with full functionality for review and control when the multimedia advertising content 112 is published; wherein those control commands 130, 130' for displaying the at least one multimedia advertising content 112 include but are not limited to any one or more of the following: play, stop, fast-forward, rewind, pause, maximize viewing, minimize, end and cancel; retrieving directions 144' related to the multimedia advertising content 112 for the captured one or more coded advertising image(s) 114; displaying the directions 144, 144' as retrieved within the coded frame 116; retrieving the at least one multimedia advertising content 112 by linking to an advertiser's website via its web address; providing for product purchases related to the coded advertising image 114; and storing a plurality of captured coded advertising images 114, 114' within an electronic folder 142 with full functionality for managing stored electronic data as are customary in the arts.

System 500 may further include display module 510 configured to display, on display 134, coded advertising images 114, 114 and multimedia advertising content 112, 112, and the like. Display module 510 may comprise a software aspect, such as display software, including, but not limited to, video software, video drivers, graphic display software, or other software suitable to display information. In another embodiment, the display module 510 may comprise a hardware aspect, such as display hardware, including, but not limited to, a video graphics card, a computer monitor, a projector, a television, other forms of viewing screens, or other hardware suitable to display computer data. In yet another embodiment, the display module 510 may comprise both hardware and software aspects, such as those described directly above and elsewhere throughout the present disclosure.

In one aspect of an embodiment of the present invention, system 500 may further include a network module 512 to enable access a computer network 124. In one embodiment, the network module 512 may be operative to access a closed computer network 124, such as a local area network, a dial-up network, or another form of closed computer network. In another embodiment, the network module 512 may be operative to access an open computer network 124, such as a world-wide-web, or any other form of open computer network. In one embodiment, the network module 512 may comprise a software aspect, such as network software, including, but not limited to, networking software such as those produced by CISCO SYSTEMS®, SUN MICROSYSTEMS®, and ORACLE®. In another embodiment, the network module 512 may comprise a hardware aspect, such as network hardware, including, but not limited to, a network adapter, a wireless network adapter, a modem, and other hardware capable of accessing and/or communicating through a network. In yet another embodiment, the network module 512 may comprise both hardware and software modules, such as those described directly above and elsewhere throughout the present disclosure.

System 500 further may include a web browser module 514 operative to transmit, locate, retrieve and/or receive over the Internet information linked to the icon 128, and/or multimedia advertising content 112. In one embodiment, web browser module 514 may comprise a software aspect, such as a computer program, including, but not limited to, MICROSOFT INTERNET EXPLORER®, NETSCAPE NAVIGATOR®, OPERA®, MOSAIC®, SAFARI®, CHROME®, or any other form of computer software or program capable of browsing a computer network 136, such as the world-wide-web. In another embodiment, web browser module 514 may comprise a hardware aspect, such as a personal computer, including but not limited to, a web pc, a laptop, an internet station, a personal digital assistant, a smart phone, and the like. In yet another embodiment, web browser module 514 may comprise both hardware and software aspects, such as those described directly above and elsewhere throughout the present disclosure. It should also be noted that, in an aspect of an embodiment of the present invention, the modules of system 500 may be in communication with one or more of each of the system modules of system 500. In another aspect of an embodiment of the present invention, system 500 may also include a controller module 516 for controlling and/coordinating all operations of system 500. Controller module 512 may also be responsible for making all determinations for system 500. Controller module 512 may also perform the operation(s) of system 500 which are not performed or covered by the other modules of system 500. Controller module 512 may also have access to computer program product having computer readable program code necessary for the execution/implementation of all operations disclosed in aspect(s) of embodiment(s) of the present invention. In an aspect of an embodiment of the present invention, the role of controller module 512 may be assigned to any one of the system modules, or a combination of the modules. In another aspect of an embodiment of the present invention, the role of controller module 512 may be undertaken by processor module 504.

In an aspect of an embodiment of the present invention, the module(s) disclosed in this disclosure may be self-contained computer hardware. In another aspect of an embodiment of the present invention, they may be computer hardware on a designated computer chip or separate computer chips. In yet another aspect of an embodiment of the present invention, the modules may be self contained hardware component(s) designated for specific operation, implementation of which may be made possible by software execution. In a further aspect of an embodiment of the present invention, the modules may be hardware resident on system(s), chip(s), component(s), separate component(s) or any combination thereof.

Methods

Figure 6:
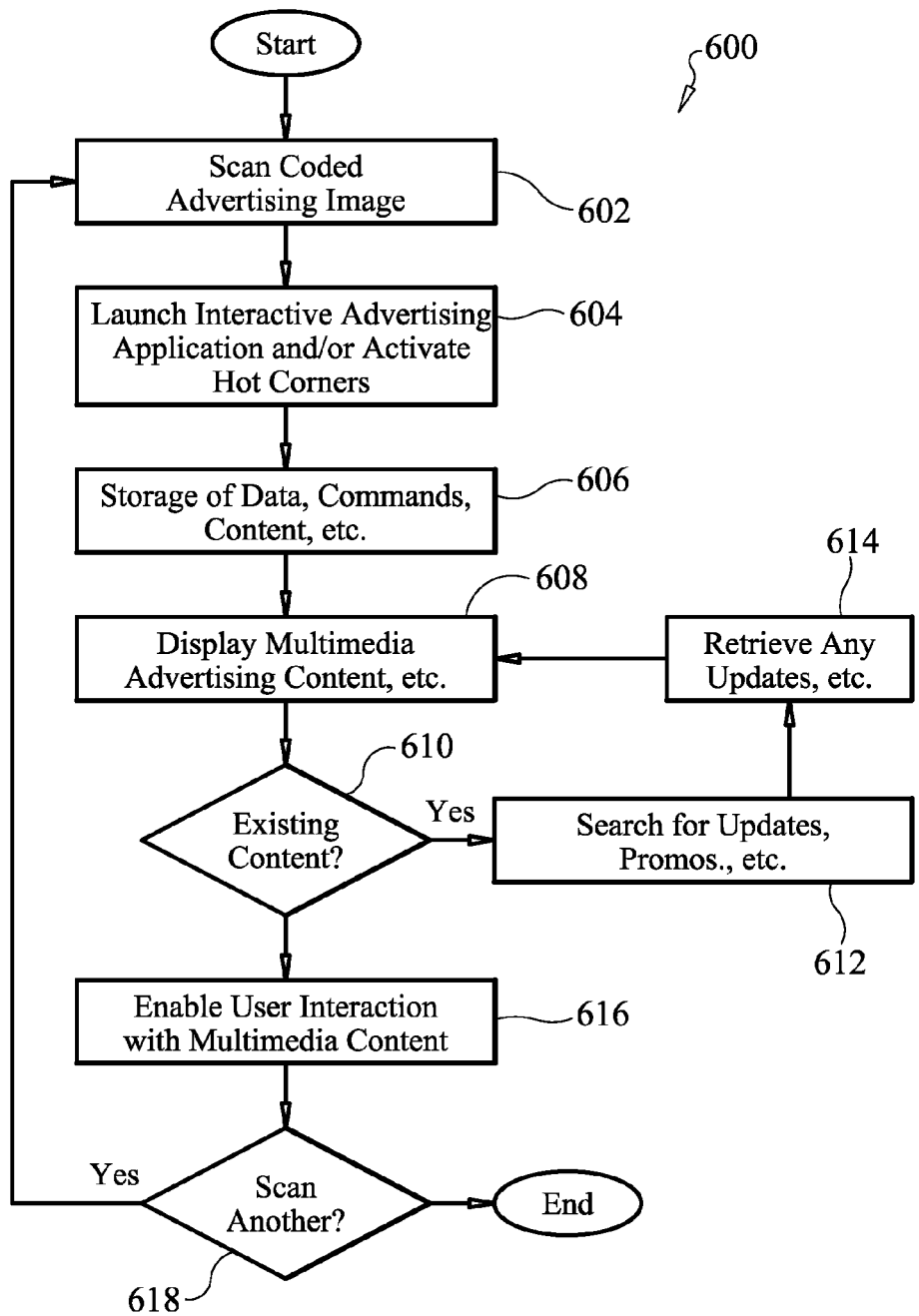
FIG. 6 illustrates a process flow according to an aspect of an embodiment of the present invention.

Referring now to FIG. 6, a process flow 600 according to an aspect of an embodiment of the present invention is shown. The process begins with a user, in step 602 scanning coded advertising image 114, which may appear within coded frame 116 of an object such a consumer product like soda cap 204, using mobile device 102. In one aspect of an embodiment of the present invention, this may be made possible by way of scanning module 516 which may coordinate such operation with processor 104 and/or server module 508. Upon scanning coded advertising image 114, the process moves to step 604 where, in one aspect of an embodiment of the present invention, interactive advertising application 110 is activated. After activation of interactive advertising application 110, the "hot corners" 118, 120, 122 and 124 of mobile device 102 are activated. In one aspect of an embodiment of the present invention, hot corners may be activated upon scanning of coded advertising image 114 as opposed to being activated after activation of interactive advertising application 110. In another aspect of an embodiment of the present invention, interactive advertising application 110 may be running in the background while the user uses mobile device 102 for other functions of mobile device 102. In which case, hot corners 118-124 may then be activated upon scanning of coded advertising image 114. Following activation of either or both of interactive advertising application 110 and/or hot corners 118, 120, 122 and 124, the scanned coded advertising image 114 may then be stored in step 606 within memory module 106. Other data, commands, content etc. may also be saved at this point. Next, in step 608 the multimedia advertising content 112 may then be displayed on display 134 (made possible by way of display module in conjunction, in one aspect, with processor 104). In an aspect of an embodiment of the present invention, the user may be notified as to whether or not he/she won something as a result of having the right code within the scanned object. Next, interactive advertising application 110 then checks to see if multimedia advertising content 112 already existed on mobile device 102. If it is determined that advertising content 112 already exists on mobile device 102, interactive advertising application 110, by way of network 136 and facilitated by communication module 140, then communicates, in step 612, with server module 508 to search for updates, videos, promotions, prizes, giveaways, vouchers, coupons, coupon codes, bar codes, discounts, pricing, availability, store locations, directions, television commercials, radio advertisements, print advertisements, movies, and movie trailers etc. (additional content) that may be relevant to the user and/or multimedia advertising content 112. If any of such are found on server module 508, then in step 614, then they are retrieved in step 614 and transmitted to device 102 at which point, they are displayed as in step 608 and interactive advertising application 110 checks again in step 610 as to whether the retrieved content already exists on mobile device 102. If they were not already downloaded to mobile device 102, the process proceeds to step 616 where the user is enabled to interact with multimedia advertising content 112 (along with any additional content). In one aspect on an embodiment of the present invention, steps 610-614 may be conducted immediately after interactive advertising content 110 may be activated before the same is stored in step 606. The user, in step 616, may then be able to interact with multimedia advertising content 112 by using hot corners 118-124 where each corner has a specific function and may be represented by icon 128. Once the user interaction is done, the user will have the option to scan another coded advertising image 112 in step 618 which, if that is the case, sends the process back to step 602. If not, the process ends.

Hardware and Operating Environment

This section provides an overview of example hardware and the operating environments in conjunction with which embodiments of the inventive subject matter can be implemented.

A software program may be launched from a computer readable medium in computer-based systems 100-500 and method 600 to execute the functions defined in this disclosure. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
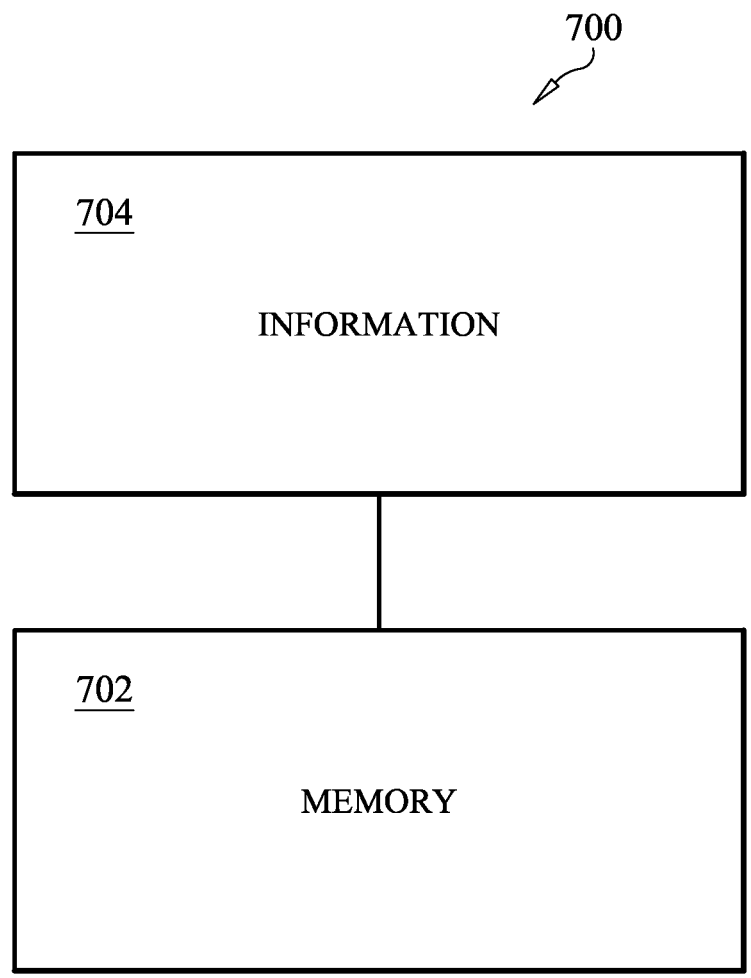
FIG. 7 illustrates a block diagram representing an apparatus according to aspect(s) of embodiment(s) of the present invention.

Referring now to FIG. 7 a block diagram representing an apparatus 700 according aspect(s) of embodiment(s) is shown. Some aspect(s) of embodiment(s) of apparatus 700 may include a computer, a memory system, a magnetic or optical disk, some other storage device, or any type of electronic device or system. The apparatus 700 may include one or more processor(s) 704 coupled to a machine-accessible medium such as a memory 702 (e.g., a memory including electrical, optical, or electromagnetic elements). The medium may contain associated information 704 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

The invention claimed is:

1. A system content interaction in a product contest or service contest, the system comprising:
a mobile device, being enabled by a scanning module, resident on the mobile device, to scan at least one coded advertising image printed and/or embedded within at least one object, which is a subject of the product contest or the service contest;
an interactive advertising application, resident on the mobile device and configured to enable user interaction with at least one multimedia content corresponding to the at least one coded advertising image, wherein the at least one multimedia content may be controlled by code embedded corners of the mobile device's display, and wherein embedded code within the at least one coded advertising image determines a game participant's success in the product contest or service contest; a communication network in communication with the mobile device and other components of the system; and a remote computer server, which is in communication with the mobile device, by way of the communication network, the computer server being configured and programmed to: enable upload of the at least one multimedia content to the remote computer server; determine the game participant's success in the product contest or service contest; determine what at least one multimedia content to send to the mobile device; and transmit the at least one multimedia content to the mobile device.

2. The system of claim 1, wherein the remote computer server is further configured to coordinate, with the processor of the mobile device, the determination of what multimedia content to send to the mobile device.

3. The system of claim 1, wherein the at least one multimedia advertising content includes any one or more of the following: updates, videos, promotions, prizes, giveaways, vouchers, coupons, coupon codes, bar codes, discounts, pricing, availability, store locations, directions, television commercials, radio advertisements, print advertisements, movies, and movie trailers.

4. The system of claim 1, wherein the interactive advertising application is configured to control the at least one multimedia content.

5. The system of claim 1, wherein the interactive advertising application is configured to capture statistical information for the at least one coded advertising image.

6. The system of claim 1, further comprising a communication module, resident on either of the mobile device or the remote computer server, wherein the communication module is configured to enable communication between the mobile device and the remote computer server.

7. The system of claim 1, wherein the remote computer server is configured to control operations of the system.

8. The system of claim 1, further comprising of a network module, wherein the network module is configured to enable access to the communication network.

9. A computer implemented method for multimedia content interaction in a product contest or service contest, comprising executing by a processor the steps of: scanning at least one coded advertising image printed or embedded within the at least one object;
launching an interactive advertising application as a result of scanning the at least one coded advertising image; determining whether a game participant has success as a result of code embedded within said at least one coded advertising image; activating, as a result of the scanning, at least one display corner having at least one hyperlink embedded within; displaying at least one multimedia advertising content corresponding with the at least one coded advertising image; enabling user interaction with the at least one multimedia advertising content using code embedded corners of a mobile device's display; and controlling the at least one multimedia content corresponding to the at least one coded advertising image by the code embedded corners of the at least one display corner of the mobile device's display, wherein embedded code within the at least one coded advertising image determines a game participant's success in the product contest or service contest.

10. The computer implemented method of claim 9, further comprising the step of storing the at least one multimedia advertising content.

11. The computer implemented method of claim 9, further comprising the step of checking for updates to the at least one multimedia advertising content.

12. The computer implemented method of claim 11, further comprising the step of retrieving at least one update to the at least one multimedia advertising content.

13. The computer implemented method of claim 9, further comprising the step of notifying a user of a prize award corresponding with the at least one coded advertising image, as a result of the scanning.

14. A computer program product comprising a non-transitory computer readable medium having control logic stored therein for causing a computer processor to enable multimedia content interaction in a product contest or service contest, the control logic comprising computer readable program code for: scanning at least one coded advertising image printed and/or embedded within at least one object; launching an interactive advertising application as a result of scanning the at least one coded advertising image; determining whether a game participant has success as a result of code embedded within said at least one coded advertising image; activating, as a result of the scanning, at least one display corner having at least one hyperlink embedded within; displaying at least one multimedia advertising content corresponding with the at least one coded advertising image;
enabling user interaction with the at least one multimedia advertising content; and controlling the at least one multimedia content corresponding to the at least one coded advertising image by the code embedded corners of the at least one display corner of the mobile device's display, wherein embedded code within the at least one coded advertising image determines a game participant's success in the product contest or service contest.

15. The computer program product of claim 14, further comprising computer readable program code for storing the at least one multimedia advertising content.

16. The computer program product of claim 14, further comprising computer readable program code for checking for updates to the at least one multimedia advertising content.

17. The computer program product of claim 16, further comprising computer readable program code for retrieving at least one update to the at least one multimedia advertising content.

18. The computer program product of claim 14, further comprising computer readable program code for notifying a user of a prize award corresponding with the at least one coded advertising image, as a result of the scanning.

\* \* \* \* \*